Nov. 23, 1948.                A. E. BAAK                2,454,424
                        COMPRESSOR CONTROL SYSTEM
Filed April 10, 1944                                2 Sheets-Sheet 2

Inventor
ALBERT E. BAAK

George H. Fisher
Attorney

Patented Nov. 23, 1948

2,454,424

UNITED STATES PATENT OFFICE 2,454,424

COMPRESSOR CONTROL SYSTEM

Albert E. Baak, Los Angeles, Calif., assignor to Minneapolis-Honeywell Regulator Company, Minneapolis, Minn., a corporation of Delaware Application April 10, 1944, Serial No. 530,423

11 Claims. (Cl. 230—11)

1

This invention relates generally to improvements in induction systems for combustion engines and more particularly to means or systems for controlling the compressor used in connection with such engines for supplying air to the intake manifold.

Particularly in the case of aircraft engines it is necessary to provide means for increasing the intake manifold pressure in order that an adequate amount of air for combustion may be provided under the widely divergent and rapidly varying conditions met with in flight. For this purpose a compressor, commonly called a supercharger, is conventionally employed and its compression ratio is varied in accordance with conditions so that the intake manifold pressure is held to the desired value. The supercharger takes the form usually of a centrifugal type compressor which is driven by a turbine actuated by the exhaust of the engine, the exhaust gases being caused to engage the turbine buckets at an angle such as to cause both turbine and compressor to rotate at high speed. The speed of both of these elements is controlled by means of a valve, commonly called a waste gate, which when opened permits the discharge of most of the exhaust gases direct to the atmosphere and which, when progressively closed, causes more and more of the gases to act on the turbine and rotate the same at increasing speeds. It is therefore seen that the positioning of this waste gate effectively varies the compression ratio of the supercharger and controls the intake manifold pressure.

It is the primary object of my present invention to provide means for positioning the waste gate and which uses power taken directly by a suitable tachometer or take-off connection from the supercharger itself for this purpose, with electrically controlled means for properly and selectively applying the power to the waste gate to open or close it as desired. Another and important object of my invention is to provide a control means or system for positioning the waste gate as described and wherein the rate at which the adjustment of the waste gate takes place is proportioned to the speed at which the turbine and compressor are operating. The rate of change may thus be said to be proportional to the requirements for change, and thus functioning of the system results in a safety factor preventing over acceleration of the turbine and also provides for rapid retardation of the speed when needed. A further object is to provide means of this character which is simple and inexpensive in form and capable of being readily applied or connected to the supercharger, and which will be positive and durable in operation. Still a further object is to provide means for positioning the waste gate which also embodies braking means for holding the waste gate in adjusted positions, such braking means being automatically releasable when the waste gate is in process of adjustment and operative to render the entire operation of the mechanism very positive and precise.

These and other objects of my invention will be made apparent in the course of the following specification, reference being had to the accompanying drawing wherein.

Figure 1:
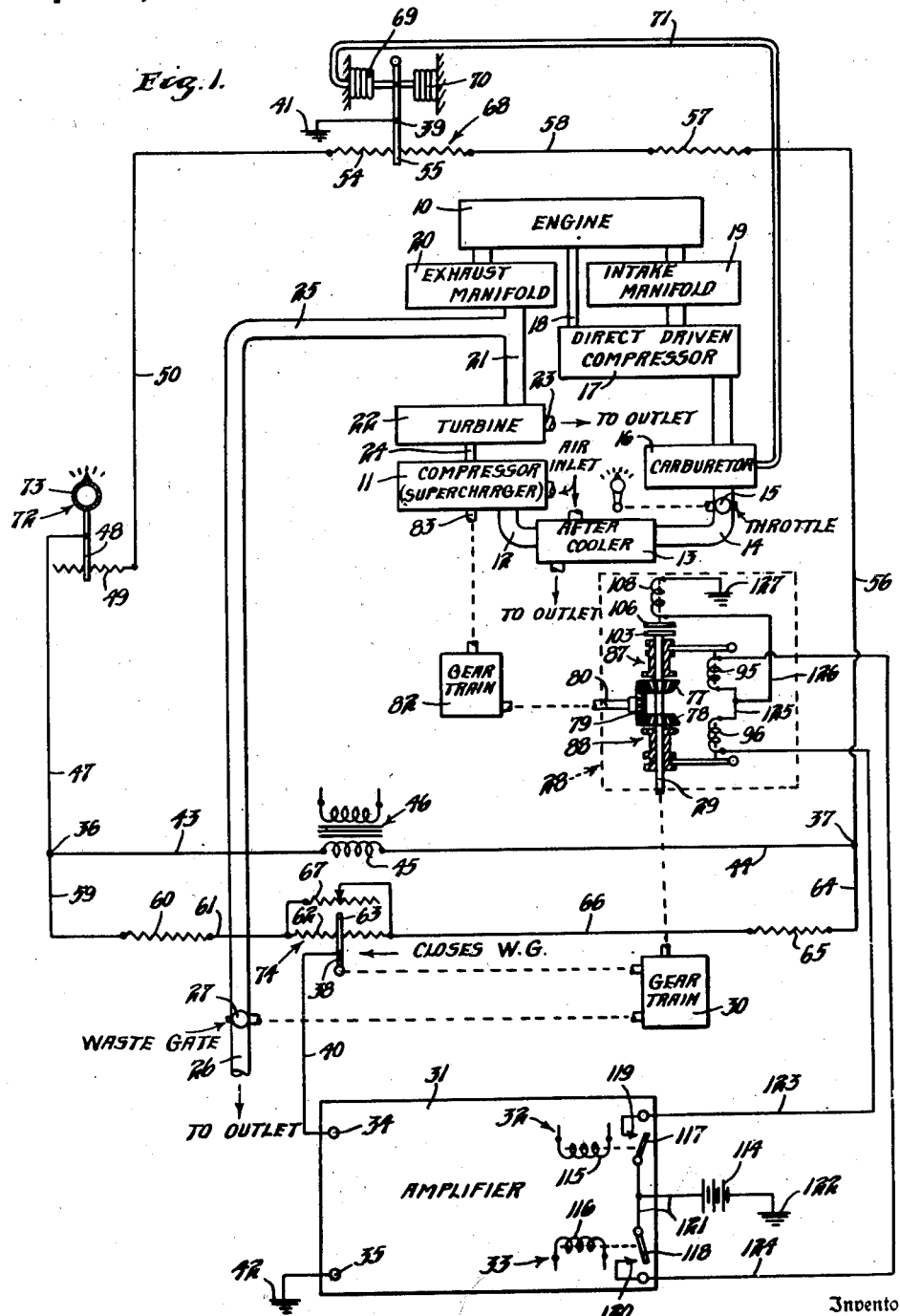
Figure 1 is a diagrammatical view illustrating the connection of my control means for systems to a turbine driven supercharger and its electrical, or electronic, actuating system.

Referring now more particularly to Figure 1 of the drawing, there is schematically shown therein a complete engine induction and exhaust system wherein is embodied an engine 10, which may be the engine of an aircraft. Air for supporting combustion in the engine is received from a suitable intake by a compressor 11, which is commonly called a supercharger, and flows from said compressor through a duct 12, an after cooler 13 by which the heat caused by the act of compression is reduced if required, through a duct 14, a throttle 15, a carburetor 16, another compressor 17 driven directly by the engine 10 through a shaft 18, and an intake manifold 19 from which the air reaches the engine itself.

The exhaust gases from the engine pass from an exhaust manifold 20 through a duct 21 to a turbine 22 and after operating said turbine escape to atmosphere through an outlet 23. The turbine 22 is connected to the compressor 11 by a shaft 24 and the rotation of the turbine by action of the exhaust gases rotates the compressor at a rate determined by the flow of exhaust gases through the turbine. The compressor 11 is of the centrifugal type and the pressure of the air at its discharge side is proportional to the speed at which it rotates.

A by-pass duct 25 leads from the duct 21 carrying the exhaust gases to the turbine 22 and delivers exhaust gases to an outlet at 26 under control of a damper valve 27, commonly called a waste gate. It is obvious that with the waste gate 27 open the resistance to flow of the exhaust gases through outlet 26 will be less than that through the turbine 22 to outlet 23 and the exhaust gases will have only a minor effect on the turbine, causing it to rotate quite slowly. However, as the waste gate is progressively closed, more and more of the exhaust gases will be diverted through the turbine 22 causing its speed to increase, and it is thus evident that the position of the waste gate 27 will control the turbine-compressor speed and pressure of the air delivered to the engine.

For positioning the waste gate 27, a reversible electric motor is commonly employed, but I employ a unit or means designated generally at 28 for this purpose. Such means includes a reversibly rotating output shaft 29 which is connected through a gear box 30 to the waste gate 27 to oppositely position the same. The construction and operation of means 28 will be set out hereinafter but for the moment it is sufficient to state that the shaft 29 is rotated in opposite directions under control of an electronic amplifier 31 embodying two relays 32—33 which when selectively closed energize the means 28 to cause opposite rotation of shaft 29.

Figure 2:
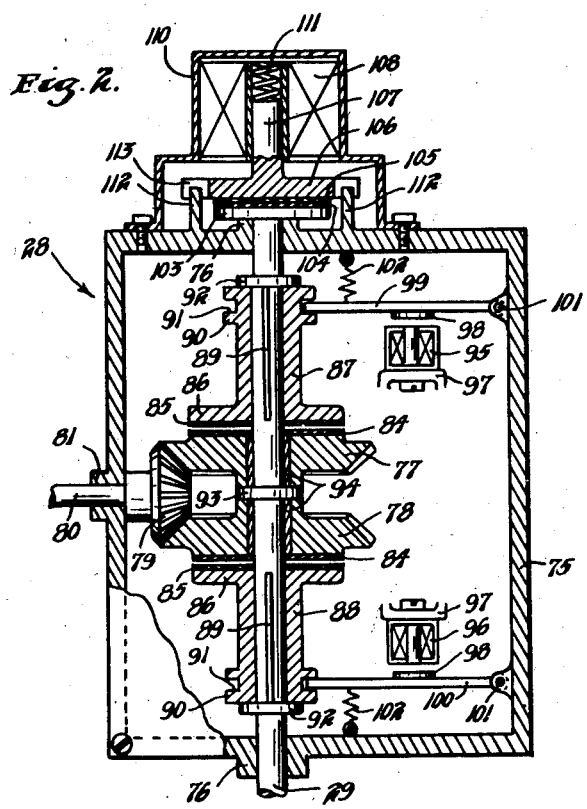
Figure 2 is a sectional view through one practical exemplification of a control mechanism suitable to my purpose.

The amplifier 31 may be of any suitable type such as that shown in Figure 2 of the copending application of Albert P. Upton, Serial No. 437,561, filed April 3, 1942, now matured into Patent No. 2,423,534 of July 8, 1947. The amplifier has input terminals 34 and 35 and is operative to selectively energize and close the relays 32 and 33 in accordance with the phase of an alternating electrical potential or signal applied to these terminals. In other words, the relay 32 will be closed when the signal at the amplifier input is of one phase, causing the shaft 29 to rotate in one direction so long as such signal is present, while the other relay 33 will be closed when the signal is of opposite phase causing the shaft 29 to rotate in the opposite direction.

The phase of the electrical signal potential supplied to the amplifier input terminals 34 and 35 is shown as determined by an electrical network of the Wheatstone bridge type, and of the type shown in the copending application of Hubert T. Sparrow, Serial No. 476,797, filed February 22, 1943, briefly described herein. This bridge or network has input terminals 36 and 37 and output terminals 38 and 39. The output terminal 38 of the bridge is connected through conductor 40 to the amplifier input terminal 34, while the output terminal 39 is connected through grounds 41 and 42 to the other input terminal 35 of the amplifier. The input terminals 36 and 37 of the bridge are connected through conductors 43 and 44 to the secondary winding 45 of a transformer 46 which supplies an alternating potential to the bridge.

The upper left branch of the bridge, as here shown, connects the input terminal 36 with output terminal 39 and may be traced from terminal 36 through a conductor 47, a slider 48, a slidewire resistance 49 with which the slider cooperates, and a conductor 50 to one terminal of a slidewire resistance 54 with which cooperates a slider 55, whereon the terminal 39 is shown as located.

The upper right branch of the bridge connects the input terminal 37 to output terminal 39 and may be traced from the former through a conductor 56, a fixed resistance 57 and a conductor 58 to the other terminal of resistance 54, and through a portion thereof to the slider 55.

The lower left branch of the bridge connects the input terminal 36 to output terminal 38 and may be traced from the former through a conductor 59, a fixed resistance 60, a conductor 61 leading to one terminal of a slidewire resistance 62, through a part of such resistance to a slider 63 cooperating therewith and to output terminal 38 which is shown as located on this slider.

The lower right branch of the bridge is shown as connecting input terminal 37 to the output terminal 38 and may be traced through a conductor 64, a fixed resistance 65 and another conductor 66 to the other terminal of the resistance 62 and through a portion thereof to the slider 63.

A variable resistance 67 is connected in parallel with the resistance 62 and serves in a conventional manner to vary the effective change in resistance in the respective lower branches of the bridge brought about by adjustment of slider 63.

The resistance 54 and slider 55 cooperate as a control potentiometer 68 and the slider is moved along the resistance in accordance with the absolute pressure of the air supplied by the compressor 11. For this purpose opposed bellows 69 and 70 are connected at their adjacent free ends to the slider 55 and one bellows has its interior connected through a conduit 71 to the carburetor 16, or may be connected to any other suitable point along the pathway of the air from the compressor 11 to the engine. The other bellows 70 is evacuated and operates in a well known manner to compensate the control for changes in ambient air pressures. It will be evident that a change in the pressure of the air supplied to the engine will be sensed by the control and indicated by the travel of the slider 55 along the resistance 54. As here shown, a decrease in this air pressure will be reflected by the travel of the slider 55 toward the left, and vice versa.

The slider 48 and resistance 49 together form a control point adjuster 72 which is manually operable by means of a knob 73.

The resistance 62 and slider 63 cooperate to form a rebalancing potentiometer 74 and the slider is adjusted along the resistance by a connection as shown to the gear box 30. The gear box 30 is of such construction that slider 63 and waste gate 27 are thus adjusted at the same time, the slider moving to the left along resistance 62 as the waste gate closes, as indicated, and vice versa.

*Operation of Figure 1*

With the parts in the positions shown, the bridge is assumed to be balanced and the output terminals 38—39 and hence the input terminals 34—35 of the amplifier 31 are at equal potential. No signal being present at the amplifier the waste gate 27 will be at rest.

Now should the pressure of the air at the discharge side of the compressor 11 fall, the bellows 69 will contract and move the slider 55 toward the left along the resistance 54 from its initial position. The potential at the output terminal 39 on the slider 55 then changes, becoming nearer the same potential as the input terminal 36, and a difference in potential will then exist between the amplifier input terminals 34—35 causing the application of a signal to the amplifier. This signal potential may, for example, cause the amplifier to close the relay 32 and thus set in operation the means 28 to rotate the shaft 29 in the proper direction to run the waste gate 27 toward the closed position. Such closing movement of the waste gate 27 will, as has been described, speed up the turbine 22 and compressor 11 to increase the compression of the air and build up the pressure again.

The closing movement of the waste gate is also accompanied by a movement of the slider 63 toward the left along resistance 62. The output terminal 38 of the bridge is thus moved toward a point of equal potential with the other output terminal 39 and as the pressure builds up again the return movement of the slider 55 by the expanding bellows 69 will cause the bridge to be rebalanced again with the waste gate 27 slightly more closed and both sliders 55 and 63 slightly to the left of their indicated positions.

The operations when the pressure of the air delivered by the compressor 11 exceeds the selected value are exactly opposite to those just described and cause the waste gate to open slightly as will be obvious.

The control point adjuster 72 may be manipulated to increase or decrease the resistance in the upper left branch of the bridge. The setting of the slider 48 determines the particular position at which the waste gate is stopped for a given value of pressure existing at the discharge side of compressor 11 and hence may be used to set the value of such pressure which is to be maintained. An increase in the amount of resistance 49 inserted in the bridge circuit has the same unbalancing effect on the bridge as an increase in the air pressure and thus such an adjustment will cause the waste gate to open and will select a lower value of pressure to be maintained. The opposite is of course true.

The means or unit 28 in accordance with my invention comprises a housing 75 in and through which is journaled the shaft 29 in bearings 76 provided in the housing ends (Figure 2). This shaft 29 carries, within the housing, two bevelled gears 77 and 78 which are journaled freely on the shaft and which mesh with a bevelled drive pinion 79 carried on a driving member or drive shaft 80. The drive shaft 80 is journaled through a bearing 81 in an adjacent wall of the housing and at its outer end may be connected (Figure 1) through a reduction gear box 82 to the turbine-compressor unit. As one convenient means of making such connection I have shown the gear box 82 as connected to the shaft 83 of the compressor 11.

Obviously, any other suitable connection may be made and in any event the drive shaft 80 of the control unit will be rotated in such manner as to turn the gears 77 and 78 in opposite directions upon the shaft 29.

The opposite faces of the gears 77 and 78 carry clutch disks or clutch facings 84 which cooperate with similar clutch elements 85 formed on the adjacent diametrically enlarged ends 86 of two clutch members 87 and 88. These clutch members are keyed or splined, as shown at 89, on the main shaft 29 to turn therewith and to slide with respect thereto endwise toward and away from the respective gears 77 and 78. At their ends remote from the gears the clutch members 87 and 88 are also diametrically enlarged as at 90 and these ends are provided with peripheral grooves 91. The movement of the clutch members away from the gears 77 and 78 is limited by stop collars 92 secured to the shaft 29 and these collars are so disposed that the clutch disks 84 and 85 will clear each other when the clutch members are thus withdrawn.

The gears 77 and 78 are properly spaced on the shaft 29 to receive and mesh with the drive pinion 79 by a center collar 93 and may be held against spreading apart along the shaft by any suitable means, such as the bearing bushings 94 on which the gears are journaled.

For operating the clutch members 87 and 88 I provide electromagnetic means comprising two electromagnets 95 and 96 rigidly supported by suitable brackets 97 in the housing 75 and having oppositely directed poles designed to attract armatures 98 forming a part of clutch actuating arms or levers 99 and 100. These arms 99 and 100 at their free ends loosely engage the grooves 91 in the respective clutch members 87 and 88 and at their other ends are pivotally mounted at 101 on the housing. The arms 99 and 100 thus traverse the ends of the electromagnets 95 and 96 and in such manner that when the magnet coils are energized, the armatures 98 will be attracted and the arms swung about their pivots 101 to urge the clutch members 87 and 88 endwise toward the gears 77 and 78, such movement, of course, engaging the clutch disks 84 and 85. Springs 102 are connected between the arms 99 and 100 and adjacent walls of the housing 75 to normally bias the arms and clutch members away from the gears 77 and 78. Naturally, the electromagnets 95 and 96 are never energized simultaneously, and the exact manner in which they are energized will presently appear.

One end of the main shaft, exteriorly of the housing 75 as it is here shown, carries a diametrically enlarged rigidly affixed brake flange 103 upon which is secured a brake disk 104 cooperating with a similar disk 105 forming a part of a stationary brake member 106. This brake member 106 has an extension 107 which is slidably mounted in the bore of a brake actuating solenoid 108, this solenoid being mounted, as shown, by flanges of its case 110 upon the housing. An expansion spring 111 in the bore of the solenoid 108 engages the end of extension 107 to normally urge the brake member 106 toward the flange 103 thereby to hold the disks 104 and 105 in frictional engagement, but the arrangement is such that when the solenoid is energized it will attract the brake member, which acts then as an armature, withdrawing it from the shaft flange against the tension of the spring 111 and so clearing the brake disk 105 from disk 104. In any position the brake member 106 is held against rotation by means of fingers 112 extending from the housing 75 parallel with the direction of movement of the member and slidably engaging diametrically opposed notches 113 in the periphery thereof.

The opposite end of the main shaft 29, exteriorly of the housing 75 is, as shown in Figure 1, connected to the gear box 30 for adjusting the waste gate 27. It will be evident that opposite rotational movements of the shaft 29 will thus open and close the waste gate, the limits of such movements being regulated by suitable stops, not here shown. Obviously, however, the specific mechanical connections used will be determined by the relative positions of the turbine-supercharger and control units, and other factors peculiar to each installation, and the arrangement here shown is for example only.

For energizing the electromagnets 95—96 and the solenoid 108 I have shown a battery 114 as a source of electrical energy and the relays 32 and 33 serve as means for selectively connecting the battery across the various coils. The relays 32 and 33 comprise coils 115—116 and movable contact arms 117—118 which are attracted by the coils, when the coils are energized, to move from the open positions shown into contact with fixed contacts 119—120. The contact arms 117—118 are biased to open positions normally, in any well known manner. The contact arms are connected by conductors 121 to one side or terminal of the battery 114 while the other side thereof is grounded as represented at 122. The fixed contact 119 is connected by a conductor 123 to one end terminal of the coil of electromagnet 96 while a conductor 124 similarly connects the fixed contact 120 with one end terminal of the coil of electromagnet 95. The other terminals or ends of the coils of both electromagnets 95 and 96 are connected by a conductor 125 and by another conductor 126 are connected to one end terminal of the solenoid 108. The other end terminal of the solenoid is grounded as represented at 127.

When the relay 32 is actuated a circuit may be traced from one terminal of the battery 114 through the conductors 121, switch arm 117, fixed contact 119, conductor 123, the coil of the electromagnet 96, the conductors 125 and 126, the solenoid 108 and to ground 127 by which return is made to the grounded terminal 122 of the battery. When the relay 33 is actuated a similar circuit may be traced from the ungrounded terminal of the battery 114 through the conductors 121, contact arm 118, fixed contact 120, conductor 124, the coil of electromagnet 95, the conductors 125 and 126, the solenoid 108 and to ground 127 by which return is again made to grounded terminal 122 of the battery. It will be noted that the electromagnets 95 and 96 are selectively energized, whereas the solenoid 108 is energized when either electromagnet is energized.

*Operation*

In operation, the gears 77 and 78 are constantly rotated in opposite directions by the drive pinion 79 which is driven by the turbine 22 through gear box 82, it being understood that the shaft 80 will rotate continuously although at a low speed when the waste gate 27 is in its nearest to open position. The gears 77 and 78, being journaled freely on the shaft 29, will thus normally not turn the same and in this connection the function of the brake mechanism is made clear. The brake member 106, under influence of the spring 111, will obviously normally exert a braking force on the end of the shaft 29 which will hold the same from creeping as the gears rotate, and will likewise bring it to a halt after each time it is moved. The brake will also act as a lock for the waste gate to which the shaft 29 is connected.

Now if the relay 32 is energized the circuit to electromagnet 96 and to solenoid 108 will be closed, energizing both. The brake member 106 being attracted by the solenoid will now free the shaft while at the same time the arm 100 will be moved by the electromagnet to urge the clutch member 88 toward the gear 78. A drive connection is thus established between this gear 78 and the shaft 29, through the clutch disks 84 and 85 and the splined connection of the clutch member and shaft, causing the shaft to slowly rotate. The arm 100 by its loose engagement with the groove 91 will permit the clutch member 88 to rotate freely. The shaft 29 is thus rotated in such manner as to move the waste gate 27 to a new position. When the relay 32 is deenergized, the circuit is immediately broken, the spring 102 disengages the clutch, disconnecting the gear 78 from the shaft, and the brake is again applied to hold the parts in their newly adjusted positions. On the other hand, when the relay 33 is energized, the circuit to electromagnet 95 and solenoid 108 is closed, releasing the brake, causing the arm 99 to move clutch member 87 into engagement with gear 77 and establishing a connection between this gear and the shaft 29. This shaft is now slowly rotated, but in the opposite direction causing an opposite adjustment of the waste gate 27. When the relay 33 is then deenergized the circuit is opened, the spring 102 releases the clutching action between the gear 77 and shaft 29, and the brake again locks the parts. Selective energization of the relays 32—33 thus is seen to enable the waste gate to be run to any desired extent toward either opened or closed positions.

Attention is called to the fact that the rapidity at which the waste gate is positioned is a function of, and directly proportional to, the speed at which the supercharger is operating. That is, when the waste gate is nearly full open and the turbine is thus turning at a comparatively slow speed, the shaft 29 will be turned slower than when the waste gate is more nearly closed and the turbine turning much faster. This difference in rate of adjustment is in contrast to the more constant rate of adjustment which results from the use of a motor for actuating the waste gate, and it has important functional advantages.

Considering the operation when the turbine is running at its slower speeds, it will be apparent that if the pilot requires higher manifold pressure he may adjust the manifold pressure selector 72 to unbalance the bridge circuit. This will result in the circuit to one of the relays being closed in order to properly engage the gears and run the waste gate toward closed position to speed up the turbine. The rate of change will be gradual, however, since the shaft 29 is initially running at low speeds, and overspeeding and damage to the turbine cannot occur even if the pilot "rams" the selector toward a higher pressure setting. On the other hand, when the turbine is running at its higher, or highest, permissible speeds, the shaft 29 will be turning faster and in this case the actuation of the proper relay to engage the gears and run the waste gate toward an open position will result in this adjustment taking place at a rapid rate of change. This is of particular advantage in that operation of the turbine at the extremely high speeds, resulting when the waste gate is in its most nearly closed position, can be carried out for only short periods of time and it is desirable that the speed be reduced rapidly when the need for peak speed is past. The turbine is ordinarily provided with means (associated with the amplifier actuating the relays 32—33) for opening the waste gate when the speed exceeds a certain range, and also when it overshoots or is accelerated too fast (as shown in the above-mentioned Sparrow application) and my control system with its differential in rate of change obviously fits nicely into the operation of such safety devices.

Having now fully disclosed my invention, what I claim as new and desire to secure by Letters Patent is:

1. In combination, a compressor, a motor for driving the same, a control device movable for controlling the speed of said motor and hence the compressing effect of said compressor, positioning means driven by said motor for positioning said control device, and control means adapted to respond automatically to a condition affected by the outlet pressure of said compressor for controlling said positioning means, said positioning means being effective when a change in position of said control device is demanded by said control means to move said control device at a rate which increases with the speed of the motor.

2. In combination, a compressor, a motor for driving the same, a control device movable for controlling the speed of said motor and hence the compressing effect of said compressor, positioning means driven by said motor for positioning said control device, and control means adapted to respond to a condition affected by the outlet pressure of said compressor for controlling said positioning means to cause the same to move said control device to a position proportional to the value of said condition, said positioning means when a change in position of said control device is demanded by said control means being effective to move said control device at a rate which increases with the speed of the motor independently of the magnitude of the change in said condition.

3. In combination, a rotary compressor, a rotary motor for driving the same, a control device movable for controlling the speed of said motor and hence the compressing effect of said compressor, a rotary shaft driven by said motor, means for selectively connecting said rotary shaft to said control device for positioning the latter in opposite directions, and control means adapted to respond to a condition affected by the outlet pressure of said compressor for controlling said connecting means, said shaft being effective when connected to said control device for movement of the latter in either direction to move said control device at a rate dependent upon that of the motor.

4. In combination, a supercharger for a combustion engine, an exhaust gas turbine for driving said supercharger, said turbine having an exhaust gas valve for controlling the speed of operation of said turbine and hence the compressing effect of said supercharger, positioning means mechanically driven by said turbine for positioning said valve, and control means adapted to respond to a condition affected by the outlet pressure of said supercharger for controlling the direction and extent that said positioning means moves said valve.

5. In combination, a supercharger for a combustion engine, an exhaust gas turbine for driving said supercharger, said turbine having an exhaust gas valve for controlling the speed of operation of said turbine and hence the compressing effect of said supercharger, a member driven by said turbine, means including clutch means for selectively positioning said valve by said member, and control means adapted to respond to a condition affected by the outlet pressure of said compressor for controlling said clutch means.

6. Mechanism for positioning the waste gate of an exhaust gas driven air compressor for a combustion engine, comprising in combination, a rotary shaft operatively connected to the waste gate to open and close the same in response to opposite movements of the shaft, another shaft operatively connected to the compressor for rotation thereby, and means for connecting said shafts for rotating the first mentioned shaft selectively in opposite directions, said member being effective when moving said valve to move it at a rate dependent upon the speed of the turbine.

7. In combination, a rotary compressor, a rotary motor for driving the same, a control device movable for controlling the speed of said motor and hence the compressing effect of said compressor, a driving member operatively connected to the rotary motor for rotation thereby, means including separate clutch members for selectively connecting the driving member and the control device for moving the latter in opposite directions, electromagnetic means for controlling and actuating the clutch members, and means responsive to a condition affected by the outlet pressure of said compressor for controlling said electromagnetic means.

8. In combination, a turbine continuously driven by the flow of gaseous fluid in a conduit, valve means affecting the flow of gaseous fluid in said conduit, and condition responsive means reversibly and mechanically connecting said turbine to said valve means so that said valve means is directly positioned by said turbine according to the conditions sensed by said condition responsive means.

9. In combination, a conduit having a gaseous fluid flowing therein, said conduit having first and second openings, continuously rotating turbine means positioned in said first opening, valve means positioned in said second opening, gear means interconnecting said turbine means and said valve means for positioning said valve means, and condition responsive means reversibly controlling said gear means and said valve.

10. In combination, fluid flow responsive means, said means comprising a rotary turbine positioned to be driven by a gaseous fluid flowing in a conduit, valve means for regulating the flow of fluid in the conduit, positioning means for said valve means, gear means continuously driven by said turbine, clutch means adapted to be actuated by means indicative of a need for a change in the flow of fluid through the conduit, and means including said clutch means for reversibly driving said valve positioning means upon a need for a change in the flow of fluid in the conduit.

11. In combination, motive means driven in accordance with the flow of gaseous fluid in a conduit, valve means located within said conduit for regulating the flow of gases therethrough, reversible gear means having a neutral position, means connecting said gear means between said valve means and said motive means so that said motive means is operative to position said valve means, condition indicating means being operative upon the occurrence of a condition indicative of a need for a change in the position of said valve means, and means connecting said indicating means to said gear means to move said means from the neutral position upon the need for a change in the position of said valve means.

ALBERT E. BAAK.

(References on following page)

REFERENCES CITED

The following references are of record in the file of this patent:

UNITED STATES PATENTS

| Number | Name | Date |
|---|---|---|
| 656,504 | Bradway | Aug. 21, 1900 |
| 697,826 | Fiske | Apr. 15, 1902 |
| 744,423 | Steckel | Nov. 17, 1903 |
| 748,488 | Eastwood | Dec. 29, 1903 |
| 818,281 | Oler | Apr. 17, 1906 |
| 934,104 | Steckel | Sept. 14, 1909 |
| 1,169,937 | Dikeman | Feb. 1, 1916 |
| 1,508,707 | Moss | Sept. 16, 1924 |
| 1,557,793 | Berger | Oct. 20, 1925 |
| 1,598,581 | Carlton | Aug. 31, 1926 |
| 1,655,683 | Standerwick | Jan. 10, 1928 |
| 1,846,687 | Mentor | Feb. 23, 1932 |
| 2,136,454 | Miller | Nov. 15, 1938 |
| 2,175,382 | Eason | Oct. 10, 1939 |
| 2,176,897 | Fodor | Oct. 24, 1939 |
| 2,220,983 | Waters | Nov. 20, 1940 |
| 2,247,151 | Clarke | June 24, 1941 |
| 2,297,237 | Nallinger | Sept. 29, 1942 |
| 2,305,810 | Muller | Dec. 22, 1942 |
| 2,376,142 | Hoffman | May 15, 1945 |

FOREIGN PATENTS

| Number | Country | Date |
|---|---|---|
| 398,902 | Germany | July 16, 1924 |
| 479,278 | Great Britain | Jan. 28, 19 |